United States Patent [19]

Krueger

[11] 4,177,673
[45] Dec. 11, 1979

[54] ANEMOMETER

[76] Inventor: Rudolph E. Krueger, 1201 Dolphin Ter., Corona Del Mar, Calif. 92625

[21] Appl. No.: 913,523

[22] Filed: Jun. 8, 1978

[51] Int. Cl.² .......................................... G01W 1/00
[52] U.S. Cl. .................................... 73/189; 308/135
[58] Field of Search ................. 73/189, 229, 231, 187; 308/135, 163, 237 R

[56] References Cited

U.S. PATENT DOCUMENTS

| 377,426 | 2/1888 | Farmer | 308/150 |
|---|---|---|---|
| 2,652,228 | 9/1953 | Merrick | 308/135 |
| 2,877,945 | 3/1959 | Trebilcock | 308/135 |
| 3,222,001 | 12/1965 | Dvorin | 308/135 |
| 3,823,611 | 7/1974 | Rudow et al. | 73/189 |
| 3,878,718 | 4/1975 | Sugiyama et al. | 73/231 R |

Primary Examiner—Anthony V. Ciarlante
Attorney, Agent, or Firm—Christie, Parker & Hale

[57] ABSTRACT

An anemometer includes a rotor assembly having front and rear bearings rotatably secured to axially spaced apart front and rear portions of a fixed rotor support shaft. Radially projecting rotor blades rotate with the bearings about the axis of the shaft in response to fluid flow directed against the blades substantially parallel to the axis of the shaft. The front bearing includes a first tapered bearing surface which tapers wider toward the rear of the shaft and bears directly against a corresponding second tapered bearing surface on the shaft. The second tapered bearing surface provides thrust and radial support upstream of the center of gravity (c.g.) and aerodynamic center of the rotor assembly for loads imposed on the rotor assembly by fluid flowing axially from front to rear along the axis of the shaft. This tends to minimize transverse motion of the rotor from bearing wear during use, resulting in accurate readings over an extended period of use of the instrument.

31 Claims, 2 Drawing Figures

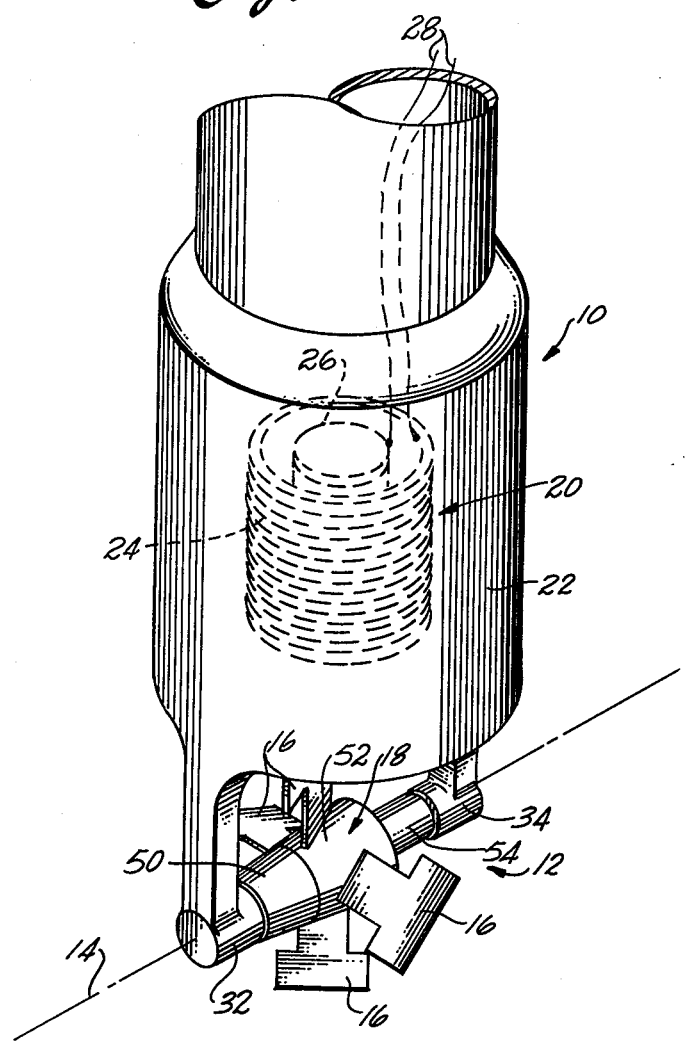

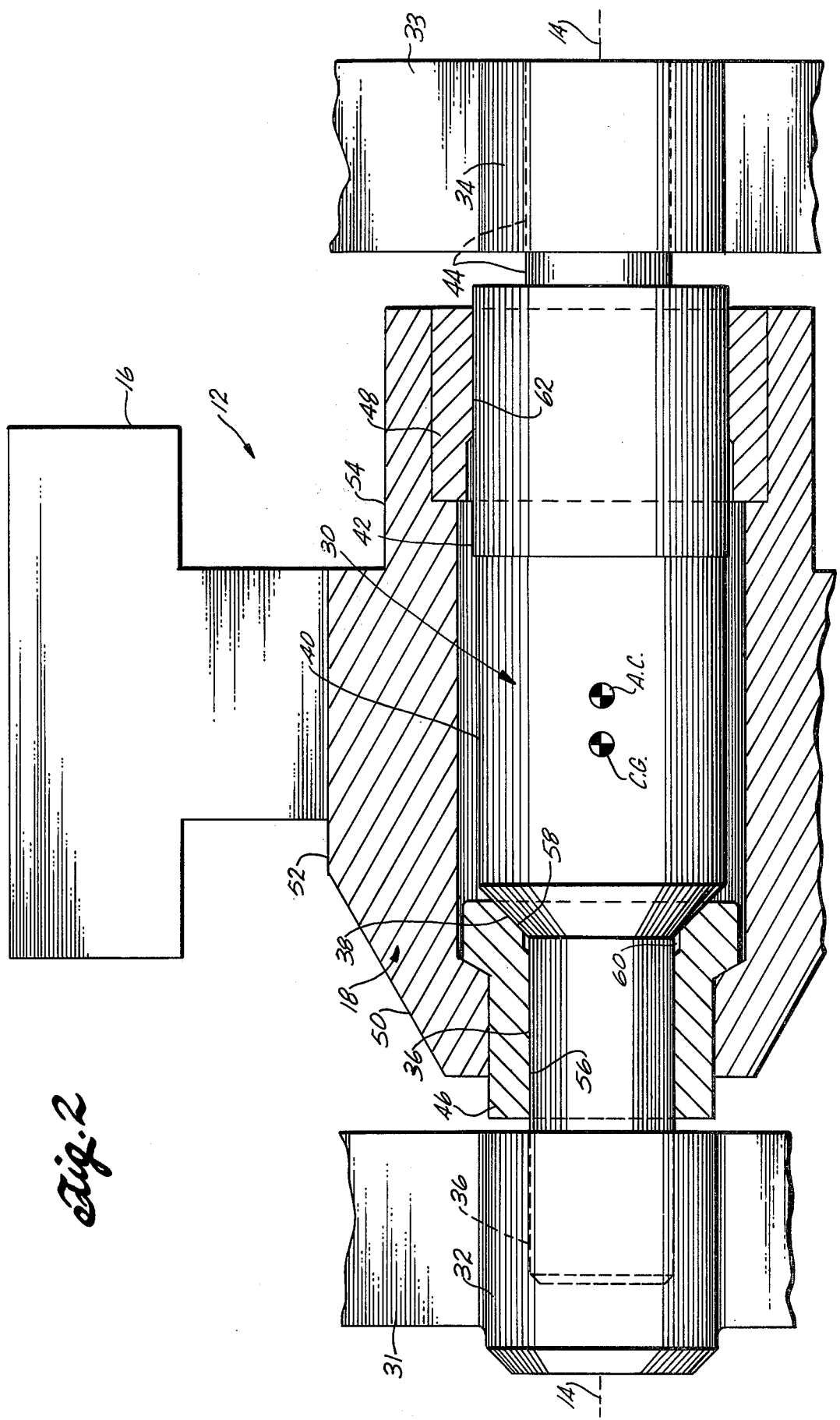

ANEMOMETER

BACKGROUND

This invention relates to anemometers, and more particularly to an anemometer having an improved bearing arrangement for supporting thrust and axial loads imposed on an anemometer rotor.

Anemometers include a rotor with radially extending blades for catching wind or other fluid flow which causes the rotor to spin about its axis. Wind speed or fluid flow rate is directly proportional to the revolutions of the rotor in a given period of time, and a transducer coupled to the rotor converts the rotational speed of the rotor into a corresponding electrical output signal proportional to wind speed or fluid flow rate.

The present invention provides an anemometer which provides accurate readings over an extended period of use in potentially destructive or corrosive environments such as in refineries, heating systems of buildings, steam power plants, and the like. In such environments where a sensitive instrument, such as an anemometer, can be subjected to hot air or steam, including superheated steam in the order of 700° F., corrosion of working surfaces of the instrument can lead to premature failure. Bushings of metal and stellite with tungsten carbide wear badly due to removal of the protective oxide coating, due to rubbing. Ball bearings with no lubricant also have intimate contact and wear due to rubbing.

This invention provides an improvement over a prior art anemometer which resulted in premature bearing failure when operated in a live steam environment at approximately 700° F. This condition precludes the use of bearings requiring lubrication, and therefore solid bearing surfaces were used in the prior art anemometer. The rotor blade assembly in the prior art anemometer was rigidly secured to a rotatable axial shaft. The rotor shaft was made of tungsten carbide, and the opposite ends of the shaft rotated in stellite front and rear bushings. During use of the prior art anemometer, severe wear occurred at the upstream or front bushing, which caused increased orbiting of the rotor shaft within its working clearance in the upstream bushing. Such orbiting increased to a point where the pickup coil sensed the wobble of the rotor shaft and produced erratic readings. The useful life of the anemometer was between three to five hours.

Thus, there is a need for an anemometer which can provide accurate readings when used in potentially destructive or corrosive environments, such as a superheated live steam environment, over an extended period of time.

SUMMARY OF THE INVENTION

Briefly, the present invention comprises an anemometer having a rotor assembly mounted on a rotor support shaft for rotation about the axis of the shaft. The rotor assembly rotates in response to fluid flow directed against it so that the speed of rotation can be conveted into an output signal proportional to fluid flow rate across the rotor assembly. The rotor assembly includes front and rear bearings secured to corresponding axially spaced apart front and rear portions of the rotor support shaft. The front bearing has a first tapered bearing surface which tapers wider toward a rear portion of the rotor support shaft. A front portion of the shaft has a second tapered bearing surface which tapers wider toward the rear portion of the rotor support shaft, and the first tapered surface of the front bearing bears against the second tapered surface of the rotor support shaft. The cooperating tapered bearing surfaces are located upstream of the center of gravity and the aerodynamic center of the rotor assembly for supporting radial and thrust loads acting on the rotor assembly from fluid flowing from front to rear along the axis of the shaft.

Since the cooperating tapered bearing surfaces taper larger toward the rear of the rotor assembly, the thrust loading acting on the rotor tends to keep the front bearing continuously seated on the rotor support shaft during use, even when wear occurs at the interface of the tapered bearing surfaces. This factor, together with the thrust and axial loading being supported upstream of the c.g. and aerodynamic center of the rotor, minimizes the chance of wobbling or orbiting of the rotor developing during use. The anemometer can be used in a live steam environment, such as in superheated steam, and provide consistently accurate results over an extended period of such use.

These and other aspects of the invention will be more fully understood by referring to the following detailed description and the accompanying drawings.

DRAWINGS

FIG. 1 is a perspective view showing an anemometer according to principles of this invention; and FIG. 2 is a fragmentary side elevation view, partly in cross-section, showing a bearing arrangement of the anemometer of this invention.

DETAILED DESCRIPTION

Referring to FIG. 1, an anemometer 10 includes a rotor assembly 12 adapted to spin about a longitudinal axis 14 in response to fluid flow acting on the rotor assembly. The rotor assembly includes four radially extending blades 16 spaced 90° apart from one another around a hub 18. The blades are angled with respect to the longitudinal axis 14 so that each blade has a frontal surface in the path of fluid flowing parallel to the axis 14. The blades 16 catch the fluid flowing parallel to the axis 14, which causes the rotor assembly to spin about the axis 14.

A pickup 20 is located inside a housing 22 above the rotor assembly 12 for converting the rotational speed of the blades 16 into a corresponding electrical signal representing wind speed or fluid flow rate. Various forms of pickups can be used, but the preferred arrangement illustrated in FIG. 1 has a coil 24 and a core 26 inside the coil. The rotor blades 16 can be made from a magnetic material, or can include magnetic elements. Movement of the magnetic blades 16 induces an electromotive force in the coil and produces a voltage signal across electrical leads 28. A transducer (not shown) connected to the electrical leads converts the voltage to a corresponding signal representing air speed or fluid flow rate. This signal can be fed to a meter (not shown).

The detailed construction of the rotor assembly 12 is shown best in FIG. 2. The rotor assembly 12 is mounted for rotation on elongated rotor support shaft 30 which is rigidly affixed at its opposite ends to a front support yoke 31 and a rear support yoke 33. Alternatively, the rotor support shaft can rotate about its axis 14 relative to fixed support bushings at its ends. The rotor support shaft is circular in cross-section and includes a cylindrical first section 36 of substantially uniform diameter for being rigidly secured inside a bore of a front bushing 32 in the front support yoke 31. The opposite end of the shaft is secured inside a bore of a rear bushing 34 in the rear support yoke 33. The first section 36 of the shaft 30 extends about 5/16 the length of the shaft, and a portion of the first section 36 extends axially away from the front bushing 32 toward the rear bushing 34. The first section 36 is continued as a tapered second section 38 which is preferably conical in shape. The tapered second section 38 tapers wider in diameter toward the rear of the shaft and is about 1/16 the length of the shaft. The angle of taper is approximately 45°. The tapered second section 38 is continued as a third section 40 of substantially uniform diameter extending approximately ¼ the length of the shaft. The uniform diameter third section 40 is substantially the same as the maximum diameter of the tapered second section 38. The third section 40 of the shaft is stepped up slightly to form a cylindrical fourth section 42 of substantially uniform diameter which extends about 3/16 the length of the shaft and is then stepped down to a cylindrical fifth section 44 of substantially uniform diameter at the rear end of the shaft. The fifth section 44 extends about 3/16 the length of the shaft and has an outside diameter substantially the same as that of the first section 36. A portion of the cylindrical fifth section is rigidly secured inside the rear support bushing 34.

The rotor assembly 12 includes a front bearing 46, also referred to as a thrust/transverse bearing, rotatably secured to the first portion 36 and the conical portion 38 of the rotor support shaft immediately adjacent the front support bushing 32. The rotor assembly also includes a rear bearing 48, also referred to herein as a stabilizing bearing, rotatably secured to the uniform diameter rear portion 42 of the rotor support shaft adjacent the rear support bushing 34. The rotor assembly 12 also includes the rotor hub 18 and the rotor blades 16. The rotor hub 18 extends axially between the front and rear bearings. A first portion of the rotor hub is rigidly affixed to the exterior of the front bearing 46, and a rear portion of the rotor hub is rigidly affixed to the exterior of the rear bearing 48. The rotor hub 18 encircles the front and rear bearings and the fixed rotor support shaft 30, and the hub is concentric with axis 14 of the rotor support shaft. The front portion of the rotor hub 18 has a tapered exterior surface 50 which tapers wider toward the rear of the hub and which is continued as an intermediate section 52 of substantially uniform diameter which is then stepped down to form a section 54 of reduced diameter, also substantially uniform in diameter, at the rear portion of the hub. The rotor blades 16 project radially outwardly from the intermediate portion 52 of the hub 18.

The front bearing 46 has a central bore which includes a first section 56 of substantially uniform inside diameter which essentially matches the outside diameter of the first portion 36 of the rotor support shaft 30. The first section 56 of the bore in the front bearing 46 is continued as a tapered conical section 58 which tapers wider toward the rear of the shaft 30 and bears directly against the conical surface 38 of the rotor support shaft. The tapered bearing surfaces 38 and 58 are directly in contact with each other, although there is relative rotation between the tapered inside surface of the bearing and the outside surface of the fixed rotor shaft. Stated another way, there is essentially zero working clearance between the tapered portion 58 of the bore in the front bearing 46 and the tapered portion 38 of the rotor support shaft. A small clearance 60 is provided in the inside surface of the front bushing adjacent the junction between the first portion 56 and the tapered portion 58 of the rotor support shaft to accommodate any slight amount of wear that may occur between the tapered bearing surfaces during use. There is only a minute amount of clearance between the uniform diameter first surface portion 36 of the shaft and the first section 56 of the bore in the front bearing.

The rear bearing 48 has a central bore of substantially uniform diameter extending from end-to-end through the bearing and essentially matching the outside diameter of the third portion 42 of the rotor support shaft. There is only a minute amount of clearance between the uniform diameter third surface portion 42 of the shaft and the inside surface 62 of the rear bearing. The clearance is a finite or positive amount, but is as small as possible to allow the rear bearing to fit around the shaft and still allow the rotor and bearing to rotate relative to the fixed shaft. The positive working clearance can prevent jamming due to accumulation of dirt or thermal changes.

In the embodiment shown, the entire length of the cooperating tapered bearing surfaces 38 and 58 is located upstream of the center of gravity (c.g.) and the aerodynamic center of the rotor assembly. As described above, the rotor assembly comprises the rotor blades 16, the rotor hub 18, the front bearing 46 and the rear bearing 48. By way of example, the location of the c.g. of the rotor assembly is illustrated in FIG. 2. The tapered bearing surfaces are considered "upstream" from the c.g. with respect to air flow or fluid flowing substantially parallel to the rotor axis 14 in a direction from the front bearing 46 toward the rear bearing 48.

The invention also can be practiced as long as at least a major portion of the length of the cooperating tapered bearing surfaces 38 and 58 is located upstream from the c.g. of the rotor assembly.

The cooperating tapered bearing surfaces 38 and 58 also are located upstream of the aerodynamic center (A.C.) of the rotor assembly. The aerodynamic center is considered to be the effective center of gravity of the airfoil surfaces of the rotor, namely, the rotor blades 16; and by way of example, the location of the aerodynamic center of the rotor is illustrated in FIG. 2.

The front bearing 46 is a combination radial and thrust bearing. The rotor support shaft 30 provides a single tapered surface 38 which can support radial and thrust loads ahead of the c.g. and the aerodynamic center on the same tapered bearing surface. Both raidal and thrust loads are produced on the rotor assembly from fluid flowing against the rotor substantially parallel to the axis 14 of the shaft from front to rear along the shaft. During use, there is essentially zero radial working clearance between the cooperating tapered bearing surfaces, and in use, the aerodynamic thrust acting on the rotor assembly tends to force the rotor assembly back against the conical surface 38 of the rotor support shaft, thereby constantly eliminating any working clearance. Any wear therefore can be compensated for by the zero working clearance being constantly present during use. Stated another way, the conical shaped bearing is held at zero clearance contact with the mating shaft due to the inherent drag force acting on the rotor assembly. The drag causes the rotor to move aft until the forward thrust bearing makes contact with the cone shaped shoulder of the shaft, producing zero clearance. Since the tapered bearing surfaces are located a short distance ahead of the c.g. and aerodynamic center of the rotor, the rotor is capable of sustaining moderate wear from radial or thrust loads acting on the rotor without the front or rear bearings becoming wobbly during use.

In one form of the invention, the front and rear bearings are made of graphite and are run on a smooth metal rotor support shaft of polished chrome-plated steel. The smooth surface avoids any sharp projections that could machine the graphite bearing, and the chrome-plated surface avoids corrosion wear problems. In one embodiment, the anemometer was operated in a superheated live steam environment at approximately 700° F., and after 150 hours of operation the instrument continued to provide accurate readings.

The present invention is based on a recognition that, in the prior art anemometer described above, the aerodynamic thrust was supported on the downstream end of the rotor shaft which turned with the rotor; and with such an arrangement, a rear thrust surface resisted transverse motion while the forward non-thrust end of the shaft could orbit in the working clearance and eventually the clearance increased due to wear. The c.g. and aerodynamic center of the rotor were ahead of where the thrust was supported, and as a result, contact loading was relatively high at the forward bushing. The localized wear at the forward bushing increased the orbiting of the rotor to a point where the pickup coil would sense rotor wobble and produce erratic readings.

In the present invention the thrust and radial loading is taken on the conical shaped bearing surface of the rotor support shaft located ahead of, but relatively close to, the c.g. and aerodynamic center of the rotor assembly. Any bearing wear does not allow increased transverse motion of the rotor. The tapered bearing surface can provide both axial and transverse support with no wobble being caused during use. The invention is especially useful in potentially corrosive environments, such as superheated live steam, in which any wear on the bearing surfaces caused by such an environment is compensated for by the approximately zero working clearance present between the tapered bearing surfaces.

The front or thrust/transverse bearing is the type that can absorb both thrust and radial loads. The location of the thrust shoulder, i.e., the conical bearing surface 38, is as near the rotor c.g. as practical. In one embodiment, the axial distance from the rotor c.g. to the zero working clearance between the thrust shoulder 38 and the tapered bearing surface 38 is less than the axial distance from the c.g. to where the rear stabilizing bearing 48 is supported on the shaft. Preferably, the rear bearing is supported on the shaft downsteam from the c.g. and the aerodynamic center of the rotor assembly.

As described above, by locating the tapered thrust surface of the front bearing ahead of the aerodynamic center tends to stabilize the rotor under continued aerodynamic loading having a component parallel to the axis of the shaft and flowing from front to rear along the shaft.

Alternatively, by locating the thrust surface, i.e., the point of restraint of the rotor shaft, downstream of the aerodynamic center, the drag on the rotor produces a couple which causes the rotor shaft to rotate around the thrust point within the restraint limits of the upstream bearing. In this instance, the couple, under continued aerodynamic loading, produces increasingly more wear or "orbiting" of the shaft within the upstream bearing. This effect cannot be stabilized and bearing wear continues to increase during continued loading.

In the present invention, the thrust restraint is ahead of the aerodynamic center, and such a moment is not produced. This causes the position of the rotor shaft to become stabilized under continued aerodynamic loading.

The rear stabilizing bearing supports a restraining load in the form of a transverse contact load. The shorter the distance between the c.g. and the thrust shoulder of the thrust/transverse bearing 46, the lower the transverse contact load. The wear of the rear stabilizing bearing can be maintained within safe limits by keeping the transverse contact load low and by keeping the working clearance of the rear bearing small. As described above, the rear bearing has as small a working clearance as possible, i.e., essentially zero working clearance, and the transverse contact load is kept at a minimum by the relatively short axial distance between the c.g. and the thrust shoulder of the thrust/transverse bearing 46.

In summary, aerodynamic loading inherently produces a zero working clearance on the thrust/transverse bearing and this utilizes the full bearing area to keep wear at a minimum. The thrust/transverse bearing is located at or ahead of the rotor c.g., and this relatively short distance produces correspondingly low contact loading on the stabilizing bushing. The thrust/transverse bearing is located at or ahead of the aerodynamic center so as to prevent the rotor from producing deteriorative bearing loads due to instability.

The rear stabilizing bearing can be located relatively far axially from the rotor c.g. This axial distance can be greater than the axial distance from c.g. to the thrust surface of the thrust/transverse bearing. Preferably, the stabilizing bearing is located downstream of the c.g. As a result of this arrangement, the transverse loading at the rear stabilizing bushing can be relatively small.

I claim:

1. In an anemometer having a rotor assembly mounted on a rotor support shaft for rotation about an axis of the shaft, the rotor assembly having blade means for catching fluid flow against it for causing the rotor assembly to rotate about its axis at a speed which is converted into a signal proportional to fluid flow rate across the rotor assembly, an improved bearing arrangement for mounting the rotor assembly for rotation about the rotor support shaft, the improvement wherein the rotor assembly includes front and rear bearings secured to corresponding axially spaced apart front and rear portions of the rotor support shaft, the rotor support shaft having a front portion having a tapered surface which tapers wider toward a rear portion of the rotor support shaft, the front bearing having a tapered surface which tapers wider toward the rear portion of the rotor support shaft and bears against the tapered surface of the rotor support shaft, at least a portion of the cooperating tapered surfaces of the front bearing and the rotor support shaft being located upstream of the center of gravity and the aerodynamic center of the rotor assembly for supporting upstream of the center of gravity and the aerodynamic center both radial and thrust loads acting on the rotor assembly from fluid flowing axially from front to rear along the rotor support shaft.

2. The improvement according to claim 1 in which the tapered surfaces of the front bearing and the rotor support shaft are conical in shape.

3. The improvement according to claim 1 in which the blade means project radially from the axis of the shaft and are aligned relative to the shaft for rotating the rotor assembly about the axis of the shaft in response to fluid flow against the blade means in a direction substantially parallel to the axis of the shaft.

4. The improvement according to claim 1 including essentially zero radial working clearance between the tapered surfaces of the front bearing and the rotor support shaft.

5. The improvement according to claim 4 in which at least the tapered surface portion of the front bearing is made of carbon.

6. The improvement according to claim 5 in which at least the tapered surface portion of the rotor support shaft is a smooth surface made from a corrosion resistant metal.

7. The improvement according to claim 1 in which the rear bearing is supported on a rear portion of the shaft at a location spaced downstream from the center of gravity and the aerodynamic center of the rotor assembly.

8. The improvement according to claim 1 including a minute working clearance between the rear bearing and the shaft.

9. The improvement according to claim 8 in which the axial distance from the center of gravity to the tapered surface contact of the front bearing with the shaft is less than the axial distance from the center of gravity to the point of contact between the rear bearing and the shaft.

10. The improvement according to claim 1 in which at least a major portion of the contact between the cooperating tapered surfaces is upstream of the center of gravity and the aerodynamic center.

11. The improvement according to claim 1 including a greater axial distance from the rear bearing surface to the center of gravity than from the contact between the tapered bearing surfaces to the center of gravity.

12. An anemometer comprising:
a rotor support shaft having a longitudinal axis; and
a rotor assembly including a front bearing rotatably secured to a front portion of the rotor shaft, a rear bearing rotatably secured to a rear portion of the rotor shaft, and rotor blade means rigidly affixed to the front and rear bearings for rotating with the front and rear bearings about the axis of the rotor support shaft in response to fluid flow directed from front to rear along the rotor support shaft substantially parallel to the longitudinal axis of the shaft, the rotor assembly having a center of gravity and an aerodynamic center;
the front bearing having a first tapered bearing surface supported by a corresponding second tapered bearing surface of the rotor support shaft, the first and second bearing surfaces having a diameter which tapers wider from front to rear of the rotor support shaft, at least a portion of the cooperating first and second tapered bearing surfaces being spaced axially forward of said center of gravity and said aerodynamic center for supporting on the second bearing surface the thrust and axial loads imposed by fluid flowing from front to rear of the shaft substantially parallel to the axis of the shaft, such axial loading producing essentially zero working clearance between the cooperating tapered bearing surfaces.

13. Apparatus according to claim 12 in which the rotor support shaft has an outside front surface portion located axially forward of said second tapered bearing surface, the front bearing having an inside front surface portion supported by the outside front surface portion of the shaft when the first and second tapered bearing surfaces bear against one another.

14. Apparatus according to claim 13 in which the diameters of the inside and outside surface portions of the front bearing and the shaft, respectively, are substantially uniform and are smaller than the maximum diameter of the second tapered bearing surface.

15. Apparatus according to claim 14 in which the rear bearing has an inside rear surface portion of substantially uniform diameter supported by a corresponding substantially uniform diameter rear outside surface portion at the rear of the rotor support shaft.

16. Apparatus according to claim 15 including approximately zero radial working clearance between the inside and outside front surface portions of the front bearing and the shaft, and between the inside and outside rear surface portions of the rear bearing and the shaft.

17. Apparatus according to claim 12 in which the rotor assembly includes an axially extending rotor hub rigidly affixed to the front and rear bearings, and a plurality of circumferentially spaced apart blades projecting radially from the hub.

18. Apparatus according to claim 17 in which the rotor blades are askew with respect to the longitudinal axis of the rotor shaft for providing a frontal surface for catching fluid flowing substantially parallel to the axis of the rotor support shaft to rotate the blades about the axis of the shaft.

19. Apparatus according to claim 12 in which the first and second tapered bearing surfaces are conical.

20. Apparatus according to claim 12 in which the rotor support shaft is fixed and the rotor assembly, with the front and rear bearings, rotates about the shaft.

21. Apparatus according to claim 12 in which the rear bearing is supported on a rear portion of the shaft at a location spaced downstream from the center of gravity and the aerodynamic center of the rotor assembly.

22. Apparatus according to claim 21 including a minute working clearance between the rear bearing and the shaft.

23. Apparatus according to claim 22 in which the axial distance from the center of gravity to the tapered surface contact of the front bearing with the shaft is less than the axial distance from the center of gravity to the point of contact between the rear bearing and the shaft.

24. Apparatus according to claim 12 in which at least a major portion of contact between the cooperating tapered bearing surfaces is upstream of the center of gravity and the aerodynamic center.

25. Apparatus according to claim 12 including a greater axial distance from the center of gravity to the rear bearing surface than from the contact between the tapered bearing surfaces to the center of gravity.

26. An anemometer comprising:
a rotor support shaft having a longitudinal axis; and
a rotor asswmbly supported on the rotor shaft for rotation about the axis of the shaft in response to fluid flow along the rotor shaft, the rotor assembly including a thrust/transverse bearing, the rotor assembly having a center of gravity and an aerodynamic center;

the thrust/transverse bearing having a tapered bearing surface supported by contact with a corresponding tapered thrust surface on the rotor shaft, at least a portion of the contact between said tapered surfaces tapering wider toward the center of gravity and the aerodynamic center and being spaced axially upstream of the center of gravity and the aerodynamic center, with respect to the direction of fluid flowing axially along the rotor shaft.

27. Apparatus according to claim 26 in which the tapered surfaces are conical in shape.

28. Apparatus according to claim 26 including essentially zero radial working clearance between the tapered surfaces.

29. Apparatus according to claim 28 in which the tapered surface portion of the thrust/transverse bearing is made of carbon, and the tapered surface portion of the thrust surface is a smooth surface made from a corrosion-resistant metal.

30. Apparatus according to claim 28 in which the rotor support shaft is fixed; and the rotor assembly, including the thrust/transverse bearing, rotates around the shaft.

31. Apparatus according to claim 28 in which a major portion of the contact between the tapered surfaces is upstream of the center of gravity and the aerodynamic center.

* * * * *